United States Patent
Stamcar

(10) Patent No.: US 11,258,979 B2
(45) Date of Patent: Feb. 22, 2022

(54) DIGITAL LEDGER CAMERA AND IMAGE FUNCTIONS

(71) Applicant: Sony Corporation, Tokyo (JP)

(72) Inventor: Damjan Stamcar, Dusseldorf (DE)

(73) Assignee: SONY GROUP CORPORATION, Tokyo (JP)

( * ) Notice: Subject to any disclaimer, the term of this patent is extended or adjusted under 35 U.S.C. 154(b) by 61 days.

(21) Appl. No.: 16/753,233

(22) PCT Filed: Nov. 28, 2017

(86) PCT No.: PCT/US2017/063489
§ 371 (c)(1),
(2) Date: Apr. 2, 2020

(87) PCT Pub. No.: WO2019/108167
PCT Pub. Date: Jun. 6, 2019

(65) Prior Publication Data
US 2020/0252578 A1 Aug. 6, 2020

(51) Int. Cl.
*H04N 5/228* (2006.01)
*H04N 5/913* (2006.01)

(52) U.S. Cl.
CPC ... *H04N 5/913* (2013.01); *H04N 2005/91342* (2013.01)

(58) Field of Classification Search
USPC .................................................. 348/222.1
See application file for complete search history.

(56) References Cited

U.S. PATENT DOCUMENTS

| | | | |
|---|---|---|---|
| 2016/0086029 A1* | 3/2016 | Dubuque | G06K 9/00979 382/159 |
| 2016/0098723 A1* | 4/2016 | Feeney | G06Q 20/065 705/75 |
| 2017/0046694 A1* | 2/2017 | Chow | G06Q 10/08 |
| 2017/0048216 A1 | 2/2017 | Chow et al. | |
| 2017/0070778 A1* | 3/2017 | Zerlan | G06F 21/6263 |
| 2017/0236123 A1* | 8/2017 | Ali | G06Q 20/3825 705/75 |
| 2018/0039667 A1* | 2/2018 | Pierce | G06F 16/2365 |
| 2018/0082043 A1* | 3/2018 | Witchey | G16H 10/60 |
| 2018/0089683 A1* | 3/2018 | Setty | G06Q 20/065 |
| 2018/0109541 A1* | 4/2018 | Gleichauf | H04L 63/123 |
| 2018/0144292 A1* | 5/2018 | Mattingly | G06Q 10/087 |

(Continued)

OTHER PUBLICATIONS

International Search Report and Written Opinion from corresponding International Application No. PCT/US2017/063489, dated Jul. 9, 2018, 14 pages.

(Continued)

*Primary Examiner* — Nigar Chowdhury
(74) *Attorney, Agent, or Firm* — Tucker Ellis LLP

(57) ABSTRACT

A camera module includes an imaging sensor that outputs raw image sensor data representative of a scene and an imaging logic engine that processes the raw image sensor data into image data in a predetermined image format. The imaging logic engine carries out a hash function to generate a hash of the image data and adds a genesis block of a digital ledger as part of the image data so that the genesis block is part of the image data in an image file output by the camera module, the genesis block containing the hash.

16 Claims, 2 Drawing Sheets

(56) References Cited

U.S. PATENT DOCUMENTS

| | | | |
|---|---|---|---|
| 2018/0211213 A1* | 7/2018 | Vivier | G06Q 10/0838 |
| 2018/0270244 A1* | 9/2018 | Kumar | H04L 9/3239 |
| 2018/0337769 A1* | 11/2018 | Gleichauf | H04L 9/3247 |
| 2019/0020468 A1* | 1/2019 | Rosenoer | H04L 63/0414 |
| 2019/0028276 A1* | 1/2019 | Pierce | G06Q 20/02 |

OTHER PUBLICATIONS

Nofer, Michael, et al., "Blockchain", Business and Information Systems Engineering, vol. 59, No. 3, pp. 183-187, Mar. 20, 2017.

* cited by examiner

DIGITAL LEDGER CAMERA AND IMAGE FUNCTIONS

TECHNICAL FIELD OF THE INVENTION

The technology of the present disclosure relates generally to electronic devices and, more particularly, to a camera having an imaging module that adds digital ledger data to an image file at creation of the image file. Also disclosed are exemplary functions that may be carried out using image files created in the disclosed manner.

BACKGROUND

Digital cameras are in wide-spread use. Images created by a digital camera are easily shared among electronic devices over the Internet. Also, digital images may be altered using photo editing software. In some circumstances, the ability to share or alter images is viewed as beneficial. For instance, sharing images through social media and the creation of "memes" using images are often considered to be positive activities.

In other circumstances, the ability to share or alter images is viewed as problematic. For instance, altered images may enter news feeds and establish an inaccurate representation of an event. Also, legal benefits attributed to an owner or creator of an image, such as copyright, may be circumvented by the unauthorized reproduction of images.

Therefore, there exists a need to improve digital image files to address these and other issues.

SUMMARY

The disclosed approach to image file creation includes adding unique information to the image data at image file creation in a camera module, before the image file is written to persistent memory. In this manner, the added information is a permanent part of the image and is contained therein even if the image is altered, transmitted to another device, converted to another file format, etc. The unique information may be in the form of a genesis block of a digital ledger, such as a blockchain. The unique information may include one or more of a hash of the image, an identifier of the camera module, a location at which the image was created, a person that took image (e.g., user of the camera), an organization or an account associated with the camera or user of the camera, or other information. Metadata (e.g., Exif data) may be further associated with the image file. Metadata may be added after the image file is created and written to persistent memory. The metadata may contain the information added to the image file at image file creation.

According to one aspect of the disclosure, a camera module includes an imaging sensor configured to output raw image sensor data representative of a scene; and an imaging logic engine configured to process the raw image sensor data into image data in a predetermined image format and carry out a hash function to generate a hash of the image data, the imaging logic engine further configured to add a genesis block of a digital ledger as part of the image data so that the genesis block is part of the image data in an image file output by the camera module, the genesis block including the hash.

According to one embodiment of the camera module, the genesis block further includes an identifier that uniquely identifies the camera module.

According to one embodiment of the camera module, the genesis block further includes an identifier of a user at the time that the scene is imaged.

According to one embodiment of the camera module, the genesis block further includes a geolocation of the camera module at the time that the scene is imaged.

According to one embodiment of the camera module, the genesis block further includes an identifier of an account associated with a legal right holder in the image file.

According to one embodiment of the camera module, image file is output by the camera module before being stored in persistent memory.

According to one embodiment of the camera module, the camera module is contained in an electronics package that is mounted to a printed circuit board, the camera module outputting the image file to a control circuit of an electronic device comprising the camera module and printed circuit board via the printed circuit board for storage in persistent memory of the electronic device or for transmission to another electronic device via a communications medium.

According to one embodiment of the camera module, the camera module does not have persistent memory.

According to another aspect of the disclosure, an electronic device includes the camera module; and a control circuit and a persistent memory configured to store the image file.

According to another aspect of the disclosure, a method of generating an image file includes imaging a scene with an imaging sensor of a camera module and outputting raw image sensor data representative of the scene from the image sensor to an imaging logic engine of the camera module; processing, with the imaging logic engine, the raw image sensor data into image data in a predetermined image format; applying, with the imaging logic engine, a hash function to the image data to generate a hash of the image data; adding, with the imaging logic engine, a genesis block of a digital ledger as part of the image data so that the genesis block is part of the image data in an image file, the genesis block comprising the hash; and outputting the image file from the camera module to a control circuit for storage in persistent memory or for transmission to a remote electronic device via a communications medium.

According to one embodiment of the method, the genesis block further includes an identifier that uniquely identifies the camera module.

According to one embodiment of the method, the genesis block further includes an identifier of a user at the time that the scene is imaged.

According to one embodiment of the method, the genesis block further includes a geolocation of the camera module at the time that the scene is imaged.

According to one embodiment of the method, the genesis block further includes an identifier of an account associated with a legal right holder in the image file.

According to one embodiment of the method, the image file is output by the camera module before being stored in persistent memory.

DETAILED DESCRIPTION OF EMBODIMENTS

Introduction

Figure 1:
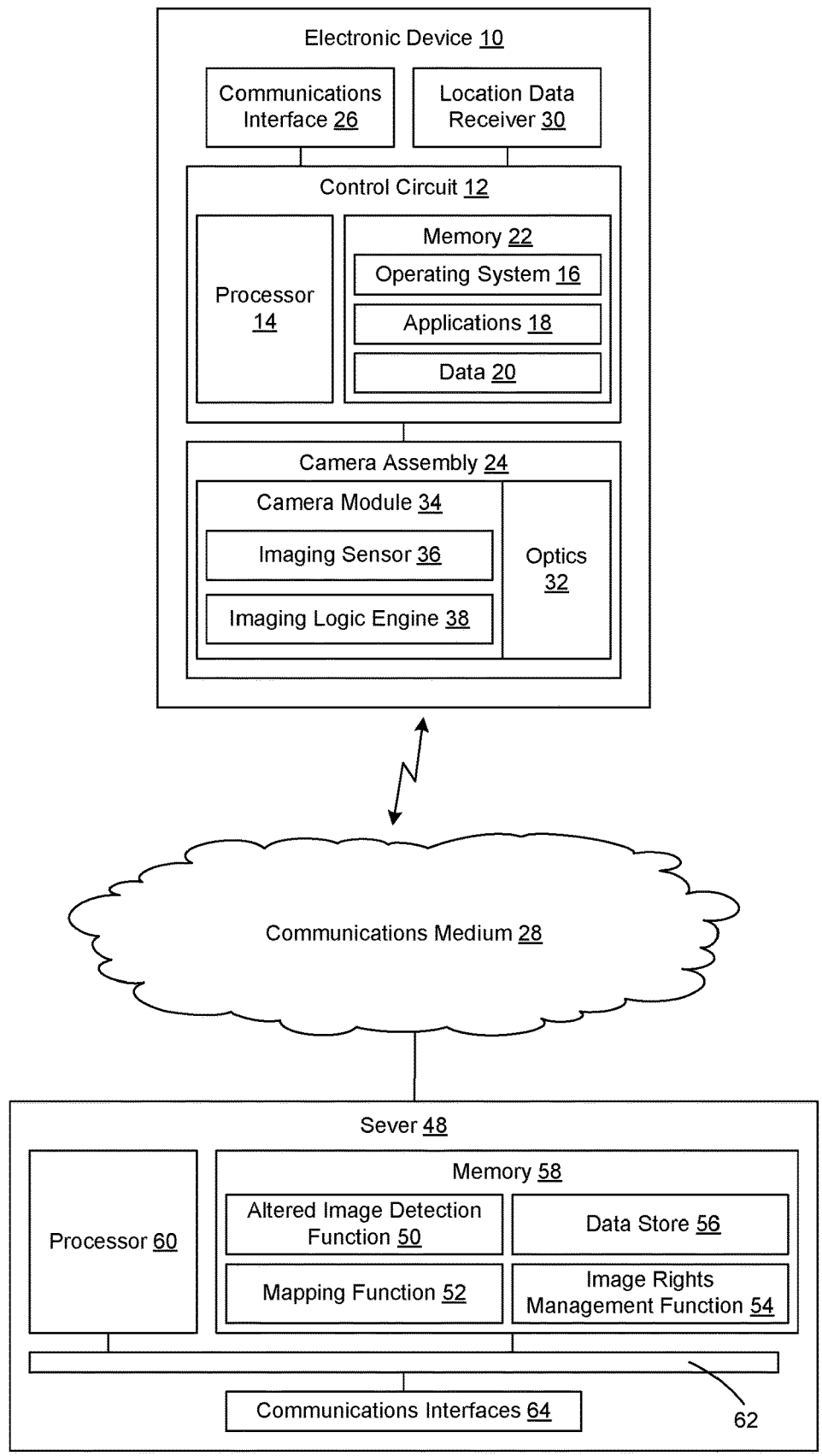
FIG. 1 is a schematic block diagram of an electronic device having a camera module that adds digital ledger information to an image file at creation of the image file, the electronic device is shown as part of a system.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for creating an image file with digital ledger information and subsequent use of the image file.

System Architecture

FIG. 1 is a schematic diagram of an exemplary system for implementing the disclosed techniques. It will be appreciated that the illustrated system is representative and other systems may be used to implement the disclosed techniques.

The system includes an electronic device 10. The electronic device 10 of the illustrated embodiment is a camera. The camera may be a stand-alone device. In other embodiments, the camera functionality of the electronic device 10 may be made part of device that has functions other than generating image files. As such, the electronic device may be, but is not limited to, a mobile radiotelephone (a "smartphone"), a user equipment or UE as contemplated under 3GPP standards, a tablet computing device, a computer, a device that uses machine-type communications, machine-to-machine (M2M) communications or device-to-device (D2D) communication (e.g., a sensor, a machine controller, an appliance, etc.), a media player, a gaming device or console, a security camera, a camera that is part of a vehicle, a camera that is part of a drone, etc.

Also, while the disclosed techniques are described in connection with the creation of still images, the disclosed techniques may be applied to video. For instance, digital ledger information may be added to each frame of video or selected frames of video using the disclosed techniques.

The electronic device 10 is configured to carry out associated logical functions that are described herein. Referring to the exemplary embodiment of a camera, the electronic device 10 includes a control circuit 12 that is responsible for overall operation of the electronic device 10. In embodiments where the electronic device 10 carries out non-camera functions (e.g., as in the case of a smartphone), the control circuit 12 also may carry out the non-camera functions of the electronic device 10.

The control circuit 12 includes a processor 14 that executes code, such as an operating system 16 and various applications 18, to carry out various functions of the electronic device 10. Logical functions and/or hardware of the electronic device 10 may be implemented in other manners depending on the nature and configuration of the electronic device 10. Therefore, the illustrated and described approaches are just examples and other approaches may be used including, but not limited to, the control circuit 12 being implemented as, or including, hardware (e.g., a microprocessor, microcontroller, central processing unit (CPU), etc.) or a combination of hardware and software (e.g., a system-on-chip (SoC), an application-specific integrated circuit (ASIC), field programmable gate array (FPGA), etc.).

The operating system 16, the applications 18, and stored data 20 are stored on a memory 22. The stored data 20 may include, but is not limited to, data associated with the operating system 16, data associated with the applications 18, and user files such as image files output by a camera assembly 24. The generation of image files by the camera assembly 24 will be described in greater detail below.

The memory 22 may be, for example, one or more of a buffer, a flash memory, a hard drive, a removable media, a volatile memory, a non-volatile memory, a random access memory (RAM), or other suitable device. In a typical arrangement, the memory 22 includes a non-volatile (persistent) memory for long term data storage and a volatile memory that functions as system memory for the control circuit 12. The memory 22 is considered a non-transitory computer readable medium. The memory 22 or another memory of the electronic device that stores image files may be separate from the control circuit 12.

In one embodiment, the electronic device 10 includes a communications interface 26 (e.g., communications circuitry) that enables the electronic device 10 to establish various wireless communication connections. In the exemplary embodiment, the communications circuitry includes a radio circuit. The radio circuit includes one or more radio frequency transceivers and at least one antenna assembly. Wired communications interfaces 26 also may be present. The communications interface 26 is operational to conduct communications with other devices over a communications medium 28 that may include one or more of a local device connected to the electronic device 10, a cellular radio network, a local area network (e.g., WiFi network), the Internet, etc.

The electronic device 10 may include a variety of other components. For instance, the electronic device 10 may include a display (not shown) for displaying visual information to a user. The display may be coupled to the control circuit 12 by a video circuit that converts video data to a video signal used to drive the display. The video circuit may include any appropriate buffers, decoders, video data processors, and so forth.

The electronic device 10 may include one or more user inputs (not shown) for receiving user input for controlling operation of the electronic device 10. Exemplary user inputs include, but are not limited to, a touch sensitive input that overlays or is part of the display for touch screen functionality, and one or more buttons. Other types of data inputs may be present, such as one or more motion sensors (e.g., gyro sensor(s), accelerometer(s), etc.).

The electronic device 10 may further include a sound circuit (not shown) for processing audio signals. Coupled to the sound circuit are a speaker and a microphone that enable audio operations that are carried out with the electronic device 10 (e.g., conduct telephone calls, output sound, capture audio, etc.). The sound circuit may include any appropriate buffers, encoders, decoders, amplifiers, and so forth.

The electronic device 10 may further include a power supply unit (not shown) that includes a rechargeable battery. The power supply unit supplies operational power from the battery to the various components of the electronic device in the absence of a connection from the electronic device 10 to an external power source.

The electronic device 10 may include one or more input/output (I/O) connectors (not shown) in the form electrical connectors for operatively connecting to another device (e.g., a computer) or an accessory via a cable, or for receiving power from an external power supply.

The electronic device 10 also may include a subscriber identity module (SIM) card slot (not shown) in which a SIM card (not shown) is received. The slot includes any appropriate connectors and interface hardware to establish an operative connection between the electronic device 10 and the SIM card.

As another example, a position data receiver 30, such as a global positioning system (GPS) receiver or global navigation satellite system (GNSS) receiver, may be present to assist in determining the location of the electronic device 10.

Turning to the camera assembly 24, the camera assembly includes optics 32 and an electronics module, also referred to as a camera module 34. The optics 32 may include any appropriate elements to direct light from a scene to be imaged to a sensor component of the camera module 34. The optical elements may include one or more of a filter, a polarizer, a lens or lenses, a prism, etc. The optics 32 may be capable of performing optical zoom and/or optical focusing.

The camera module 34 includes an imaging sensor 36, such as a charged coupled device (CCD) sensor. The imaging sensor 36 outputs raw sensor data representative of the scene. The camera module 34 also includes an imaging logic engine 38. The imaging logic engine 38 executes logic (e.g., code or executable instructions) that processes the raw sensor data and outputs image data from the camera module 34 in the form of an image file. The imaging logic engine 38 may be implemented with an image processor and associated executable logic, or any other appropriate combination of hardware and logic components (e.g., microprocessor, microcontroller, CPU, ASIC, SoC, FPGA, etc.). As will be described, the imaging logic engine 38 has a logic layer that applies logic to incorporate a genesis block of a digital ledger (e.g., a blockchain) into the image data output by the camera module 34. In a typical arrangement, the camera module 34 may include buffers for temporary data storage and manipulation, but does not include any long-term or persistent data storage capabilities.

Image File Generation

Figure 2:
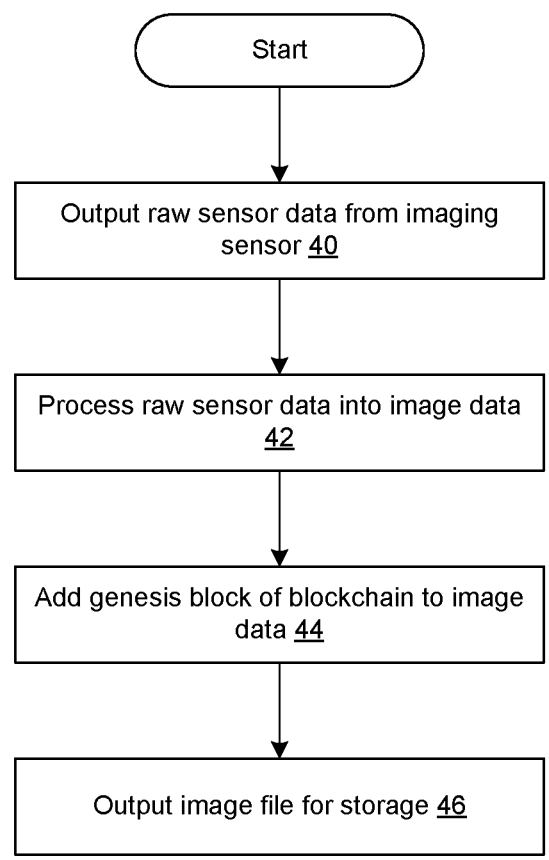
FIG. 2 is a flow diagram of a representative method of creating an image file.

With additional reference to FIG. 2, shown is an exemplary flow diagram representing steps that may be carried out by the camera module 34 to generate an image file. Once generated, the image file may be stored in persistent memory. FIG. 2 illustrates an exemplary process flow and, although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 40. In block 40, imaging sensor 36 is exposed to light from the scene and outputs raw sensor data representative of the scene. The raw sensor data output by the imaging sensor 36 is input to the imaging logic engine 38, which carries out the remaining steps illustrated in FIG. 2. For instance, in block 42, the raw sensor data is processed by the imaging logic engine 38 into image data that is arranged in an appropriate image file format in which a digital photo may be stored as an image file in persistent memory, such as a JPEG image format, a RAW image format, a PNG image format, etc.

In block 44, the imaging logic engine 38 adds a genesis block of a digital ledger to the image data from block 42. The result of block 44 is appended image data arranged in the image file format used in block 42 and where the appended image data contains the image data from block 42 and the genesis block of the digital ledger. In this manner, the genesis block becomes part of the image data, and the two are indistinguishable (to applications capable of handling the image format of the image file and without specialized functionality to read the genesis block) and/or are inseparable. Digital ledgers are distributed databases that are consensually shared and synchronized across multiple sites, and are generally considered incorruptible. Digital ledger technology is commonly used to track a series of transactions, events or data related to an item such as cryptocurrency. In the embodiments described herein, the item is the image file. Exemplary digital ledgers include, but are not limited to, blockchain and Ethereum.

The genesis block of the digital ledger may contain one or more data items. One data item is a hash of the image data from block 42. The hash may be established by applying a hash function arranged to result in a unique value for the image data depending on the visual content represented by the image data. Subsequent applications of the hash function to the appended image data should result in the same hash.

Another data item that may be included in the genesis block is a unique identifier of the camera module 34 that may distinguish the camera module 34 from all other camera modules 34. Another data item that may be included in the genesis block is a location of the electronic device 10 at the time that the image data was captured. The location of the electronic device 10 may be determined using the location data receiver 30 or other geolocation determining mechanism. Other data that may be included in the genesis block may be an identity of the user of the electronic device 10 at the time that the image data was captured. Other data that may be included in the genesis block may be an identity of an organization or other entity that is associated with either the user or the electronic device 10. Other data that may be included in the genesis block may be an identity of an account that is associated with either the user or the electronic device 10 (e.g., a social media account, an email account, a payment account, a website, etc.).

In block 46, an image file is output by the camera module 34. The image file is a persistently storable version of the appended image data in a designed format (e.g., JPEG, PNG, RAW, etc.). The image file may be output to the control circuit 12 for storage in the memory 22 and/or for transmission to and storage by another electronic device over the communications medium.

In one embodiment, the genesis block or the data items contained in the genesis block also are added to the image file as metadata. Adding the metadata may be performed by the control circuit 12 or by the camera module 34. Adding the genesis block or the data items to metadata may facilitate subsequent reading of the genesis block or the data items by other devices that do not have knowledge of how the genesis block is encoded into the image data. The specific manner that the genesis block is encoded into the image data may be retained as confidential information, but various applications (e.g., the functions described in the next section) may be programmed with functionality to read the genesis block from the appended image data of the image file. The genesis block that is part of the appended image data of the image file may be considered more secure than metadata since metadata may be removed or altered. Therefore, the genesis block that is part of the appended image data may be considered an official version for use in secure operations involving the image file.

As will be understood, the genesis block is added to the image data to produce an image file for the imaged scene before the image file is stored in persistent memory. The genesis block is added to the image data in the physical package of the camera module 34. The package of the camera module 34 may be an electronics package that is mounted to a printed circuit board that, in turn, interconnects the camera module 34 with the control circuit 12 and potentially with other components (e.g., a power supply). Therefore, the genesis block is added to the image data before the image data leaves the physical unit of camera module 34.

PRACTICAL APPLICATIONS

Digital ledgers provide an inherent level of security to data associated with the digital ledger. The operation of digital ledgers will not be described in this disclosure, but their attributes may be used for various functions in connection with the image file output by the camera module 34 in block 46 of the flow diagram of FIG. 2. Thus, the data contained in the image files may be used in a standardized way across multiple platforms and devices to carry out various functions. As an example, as image files are shared and retransmitted, it may be possible access information from a digital ledger deriving from the genesis block. Using this information, a user may communicate back to the electronic device 10 from which the image file originated or communicate with an account owned by the user of the electronic device 10 from which the image file originated.

Many of these functions may take place in connection with one or more servers 48 accessible though the communications medium 28. Various functions will be described in connection with the server 48 illustrated in FIG. 1. In other embodiments, different functions may be handled by different servers and/or distributed across computing platforms.

The server 48 may be implemented as a computer-based system that is capable of executing computer applications (e.g., software programs). Exemplary applications include an altered image detection function 50, a mapping function 52, and an image rights management function 54. The applications, when executed, carry out functions of the server 48 that are described herein. The applications and a data store 56 may be stored on a non-transitory computer readable medium, such as a memory 58. The data store 24 may be used to store various information sets used to carry out the functions described in this disclosure. The memory 58 may be, for example, a magnetic, optical or electronic storage device (e.g., hard disk, optical disk, flash memory, etc.), and may comprise several devices, including volatile and non-volatile memory components. Accordingly, the memory 58 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

To execute logical operations, the server 48 may include one or more processors 60 used to execute instructions that carry out logic routines. The processor 60 and the memory 58 may be coupled using a local interface 62. The local interface 62 may be, for example, a data bus with accompanying control bus, a network, or other subsystem.

The server 48 may have various input/output (I/O) interfaces for operatively connecting to various peripheral devices. The server 48 also may have one or more communications interfaces 64. The communications interface 64 may include for example, a modem and/or a network interface card. The communications interface 64 enables the server 48 to send and receive data to and from other computing devices via the communications medium 28. In one embodiment, the server 48 may be configured to host the described services for a plurality of electronic devices, including the electronic device 10. Some of the services may be accessed by user devices or systems that are not illustrated. However, the configuration and operation of such devices will be understood to the person of ordinary skill in the art.

The altered image detection function 50 may assist in detecting if the image content of the image file has been altered, such as with the use of photo editing software. There may be legitimate uses of altered images, but altered images also may be used to present an inaccurate representation of a scene as might be found in "fake news" reports. The altered image detection function 50 may apply the hash function to the image data of an image file to be assessed for alteration. If the image content itself is unaltered relative to the image file output by the camera module 34, the same hash value present in the genesis block should result. Similarly, if the image content itself has been altered, a different hash value than present in the genesis block should result. Therefore, a determination may be made as to whether the image content has been altered or not altered relative to the image data originally output by the camera module 34. Media consumers, news organizations and other users may employ the altered image detection function 50 to determine if the image content has been altered. If an altered version is detected, the hash from the genesis block may be used to search for an unaltered version of the image file.

Some alterations to an image may be acceptable for some purposes. For instance, an image may be cropped, have its resolution changed, undergo sharpening, etc. A user may wish confirm that the changes were made by a trusted party and/or are visually acceptable. To do this, data from an appropriate block of a digital ledger flowing from the genesis block may be used to determine the party making the change and/or the nature of the change. The authenticity of the overall digital ledger may be confirmed by determining that the digital ledger derives from the genesis block contained in the appended image data of the image file. The digital ledger also may be used to obtain copies of the original image file and a later version of the image file to make a visual or electronic comparison.

The mapping function 52 may employ the geolocation information that is present in the genesis block to construct a map of an area if provided with a satisfactory number of images files from the area. The actual visual content from the image files need not be employed for this purpose. Cartographers and map/navigation service providers have done a reasonable job of mapping streets and areas navigable by vehicles. But there is a lack of mapping data for many indoor places and other places that are inaccessible by vehicles and/or unauthorized persons. In one embodiment, images from one or multiple electronic devices 10 that are taken at an area of interest may be collected over time and used to map the environment. In another embodiment, the electronic device 10 may be moved through the area of interest with the specific intent of mapping the environment by following a predetermined mapping approach. During the purposeful movement of the electronic device 10 to generate a map of an indoor environment where GPS location services may have inaccuracies, additional or alternative location assistance may be employed, such as a WiFi beacon arrangement. In one embodiment, the map may be a "three-dimensional" map that accounts for elevation changes within the mapped area.

The image rights management function 54 may be used to facilitate communication back to the electronic device 10 from which the image file originated or to communicate with an account owned by the user of the electronic device 10 from which the image file originated. In one embodiment, use of the image file in news media or for other purposes may be subject to license terms or payment requirements. From the digital ledger associated with the image file, the image rights management function 54 may determine the license terms or payment requirements associated with the image file. Then, if appropriate, payment to an appropriate party or account may be made. The appropriate party need not be a person or entity associated with the electronic device 10 that captured the image. Rather, data from an appropriate block of a digital ledger may be used to determine the appropriate party or account for payment. The authenticity of the overall digital ledger may be confirmed by determining that the digital ledger derives from the genesis block contained in the appended image data of the image file. In this way, a buyer or licensee of the rights in the image content may validate the party making the sale or license.

CONCLUSION

Although certain embodiments have been shown and described, it is understood that equivalents and modifications falling within the scope of the appended claims will occur to others who are skilled in the art upon the reading and understanding of this specification.

What is claimed is:

1. A camera module in the form of a physical package in which are comprised:
    an imaging sensor and associated optics, the imaging sensor configured to output raw image sensor data representative of a scene; and
    an imaging logic engine configured to process the raw image sensor data into image data in a predetermined image format and carry out a hash function to generate a hash of the image data, the imaging logic engine further configured to add a genesis block of a digital ledger as part of the image data so that the genesis block is part of the image data in an image file output by the camera module in the form of a physical package, the genesis block comprising the hash; and
    wherein the camera module in the form of a physical package is mountable to a printed circuit board over which the image file output by the camera module in the form of a physical package is operatively communicated to electronics outside the camera module in the form of a physical package; and
    wherein the camera module in the form of a physical package does not have a persistent memory.

2. The camera module of claim 1, wherein the genesis block further comprises an identifier that uniquely identifies the camera module.

3. The camera module of claim 1, wherein the genesis block further comprises an identifier of a user at the time that the scene is imaged.

4. The camera module of claim 1, wherein the genesis block further comprises a geolocation of the camera module at the time that the scene is imaged.

5. The camera module of claim 1, wherein the genesis block further comprises an identifier of an account associated with a legal right holder in the image file.

6. An electronic device comprising:
    the camera module of claim 1; and
    a control circuit and a persistent memory configured to store the image file.

7. The electronic device of claim 6, further comprising the printed circuit board, the camera module mounted on the printed circuit.

8. The camera module of claim 1, wherein the genesis block and the image data are indistinguishable to applications capable of handling an image format of the image file and without specialized functionality to read the genesis block.

9. The camera module of claim 1, wherein the genesis block and the image data are inseparable.

10. A method of generating an image file with a camera module in the form of a physical package, comprising:
    imaging a scene with an imaging sensor and associated optics of the camera module in the form of a physical package and outputting raw image sensor data representative of the scene from the image sensor to an imaging logic engine of the camera module in the form of a physical package;
    processing, with the imaging logic engine, the raw image sensor data into image data in a predetermined image format;
    applying, with the imaging logic engine, a hash function to the image data to generate a hash of the image data;
    adding, with the imaging logic engine, a genesis block of a digital ledger as part of the image data so that the genesis block is part of the image data in an image file, the genesis block comprising the hash; and
    outputting the image file from the camera module to a control circuit for storage in persistent memory or for transmission to a remote electronic device via a communications medium; and
    wherein the camera module in the form of a physical package is mountable to a printed circuit board over which the image file output by the camera module in the form of a physical package is operatively communicated to the control circuit, the control circuit being electronics outside the camera module in the form of a physical package; and
    wherein the camera module in the form of a physical package does not have a persistent memory.

11. The method of claim 10, wherein the genesis block further comprises an identifier that uniquely identifies the camera module.

12. The method of claim 10, wherein the genesis block further comprises an identifier of a user at the time that the scene is imaged.

13. The method of claim 10, wherein the genesis block further comprises a geolocation of the camera module at the time that the scene is imaged.

14. The method of claim 10, wherein the genesis block further comprises an identifier of an account associated with a legal right holder in the image file.

15. The method of claim 10, wherein the genesis block and the image data are indistinguishable to applications capable of handling an image format of the image file and without specialized functionality to read the genesis block.

16. The method of claim 10, wherein the genesis block and the image data are inseparable.

* * * * *